US009972020B1

(12) United States Patent
Eichler et al.

(10) Patent No.: US 9,972,020 B1
(45) Date of Patent: May 15, 2018

(54) TARGETED, COMPETITIVE OFFERS WHILE BROWSING

(75) Inventors: Ronnie Allen Eichler, San Antonio, TX (US); Bradly Jay Billman, San Antonio, TX (US); Reynaldo Medina, III, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 1363 days.

(21) Appl. No.: 12/101,841

(22) Filed: Apr. 11, 2008

(51) Int. Cl.
*G06Q 30/02* (2012.01)

(52) U.S. Cl.
CPC .................... *G06Q 30/02* (2013.01)

(58) Field of Classification Search
CPC ........... G06Q 30/0207; G06Q 30/0222; G06Q 30/0251; G06Q 30/0253; G06Q 30/0255; G06Q 30/0256
USPC ........... 705/14.1, 14.23, 14.49, 14.51, 14.53, 705/14.54
See application file for complete search history.

(56) References Cited

U.S. PATENT DOCUMENTS

| | | | |
|---|---|---|---|
| 6,804,659 B1 | 10/2004 | Graham et al. | 705/14 |
| 8,868,740 B2 * | 10/2014 | Pitchaikani | H04L 67/20 709/219 |
| 2005/0209874 A1 | 9/2005 | Rossini | 705/1 |
| 2007/0061301 A1 * | 3/2007 | Ramer et al. | 707/3 |
| 2007/0073580 A1 | 3/2007 | Perry et al. | 705/14 |
| 2007/0073717 A1 * | 3/2007 | Ramer et al. | 707/10 |
| 2007/0100653 A1 * | 5/2007 | Ramer et al. | 705/1 |
| 2007/0162337 A1 | 7/2007 | Hawkins et al. | |
| 2007/0168506 A1 * | 7/2007 | Douglas | H04L 67/20 709/224 |
| 2007/0260635 A1 * | 11/2007 | Ramer et al. | 707/104.1 |
| 2008/0009268 A1 * | 1/2008 | Ramer et al. | 455/412.1 |
| 2008/0040226 A1 * | 2/2008 | Roker | G06Q 30/02 705/14.56 |
| 2008/0046313 A1 | 2/2008 | Chen | 705/14 |
| 2008/0140476 A1 * | 6/2008 | Anand et al. | 705/7 |
| 2008/0214149 A1 * | 9/2008 | Ramer et al. | 455/414.1 |
| 2008/0214151 A1 * | 9/2008 | Ramer et al. | 455/414.1 |
| 2008/0214152 A1 * | 9/2008 | Ramer et al. | 455/414.1 |
| 2008/0214153 A1 * | 9/2008 | Ramer et al. | 455/414.1 |
| 2008/0270228 A1 * | 10/2008 | Dasdan | G06Q 30/02 705/14.54 |
| 2008/0288339 A1 * | 11/2008 | Streeter | G06Q 30/02 705/14.13 |

(Continued)

OTHER PUBLICATIONS

Ngai, E.W.T., "Selection of web sites for online advertising using the AHP," Information and Management, http://www.sciencedirect.com, downloaded 2008, 1-10.

*Primary Examiner* — Sara C Hamilton
(74) *Attorney, Agent, or Firm* — Kane Kessler, P.C.; Barry E. Negrin

(57) ABSTRACT

Systems, methods and computer readable media are disclosed for providing targeted offers to a user who has a pre-existing account with the offeror based on information of the account and the user's web browsing information. In addition to the general system, systems, methods and computer readable media for such targeted offers, the targeted offer provider may comprise a combination of a web browser toolbar and a computing system linked across a communications network, the networking equipment of an internet service provider, and a proxy computing device.

5 Claims, 3 Drawing Sheets

(56) References Cited

U.S. PATENT DOCUMENTS

| | | |
|---|---|---|
| 2009/0106100 A1 | 4/2009 | Mashinsky |
| 2009/0240580 A1* | 9/2009 | Schwarz ................ G06Q 30/02 705/14.72 |
| 2010/0095220 A1* | 4/2010 | Kassab ............... G06F 17/3089 715/745 |
| 2010/0138271 A1* | 6/2010 | Henkin ................. G06Q 30/02 705/14.54 |
| 2017/0116639 A1* | 4/2017 | Tunguz-Zawislak ......................... G06Q 30/0256 |

* cited by examiner

TARGETED, COMPETITIVE OFFERS WHILE BROWSING

CROSS-REFERENCE

This application is related by subject matter to the subject matter disclosed in the following commonly assigned applications, the entirety of which are hereby incorporated by reference herein: U.S. patent application Ser. No. 12/101,828, filed Apr. 11, 2008, and U.S. patent application Ser. No. 12/101,849, filed Apr. 11, 2008, each filed on even date herewith and each entitled "Targeted, Competitive Offers While Browsing."

BACKGROUND OF THE INVENTION

The effectiveness of Internet-based advertising depends largely on an advertiser's ability to tailor its ads to a specific user. For example, a user residing in California is much more likely to patronize a drug store with locations only in California than is a user residing in Texas. Likewise, a retiree on a small, fixed income is much less likely to be interested in purchasing an expensive sports car than is a practicing physician who is earning a great deal of money. As such, on-line advertisers are frequently concerned with gaining information about users so that they can better determine what advertisements to present, so that their advertisements will be more effective. A problem exists because advertisers usually lack information about users.

This problem is exacerbated where the terms of an advertised offer depend on characteristics of the user, such as with insurance. The rate and terms which an insurance company is willing to offer health insurance to a user can vary greatly based upon the user's present health, medical history, age, dietary and physical exercise habits, and the like. It may be that, without knowing a sufficient amount of such information, an advertiser is unable to make an offer to an individual at all. This problem may be alleviated where the user already possesses an account with the advertiser (such as where the user has a health insurance policy and the advertiser is an insurance company) and the advertiser is able to use information taken from this account to more accurately determine the details of an offer to be made to the individual.

SUMMARY OF THE INVENTION

In example embodiments of the present disclosure, a method and system are provided to allow a company or entity that a user has an account with to provide targeted, competitive offers to that user while that user is accessing data on a communications network.

The method may include, but does not require, an offer engine receiving from a user's computing device browsing information about the user. The offer engine may receive this information in a variety of ways. For instance, it could function as a proxy that exists between the user's computing device and other computing devices on the communications network, or it could communicate with a software program executing on the user's computing device. The offer engine takes the browsing information and then determines a subject for the browsing information, determines a targeted offer (including specific details, such as price) based on the subject of the browsing information and the user's account information. Finally, the offer engine sends to the user the offer.

A system and computer readable medium are also disclosed that perform comparable functions as the method discussed above.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The systems, methods, and computer readable media for providing targeted, competitive offers to a user who is accessing a communications network in accordance with this specification are further described with reference to the accompanying drawings in which.

DETAILED DESCRIPTION OF ILLUSTRATIVE EMBODIMENTS

Figure 1:
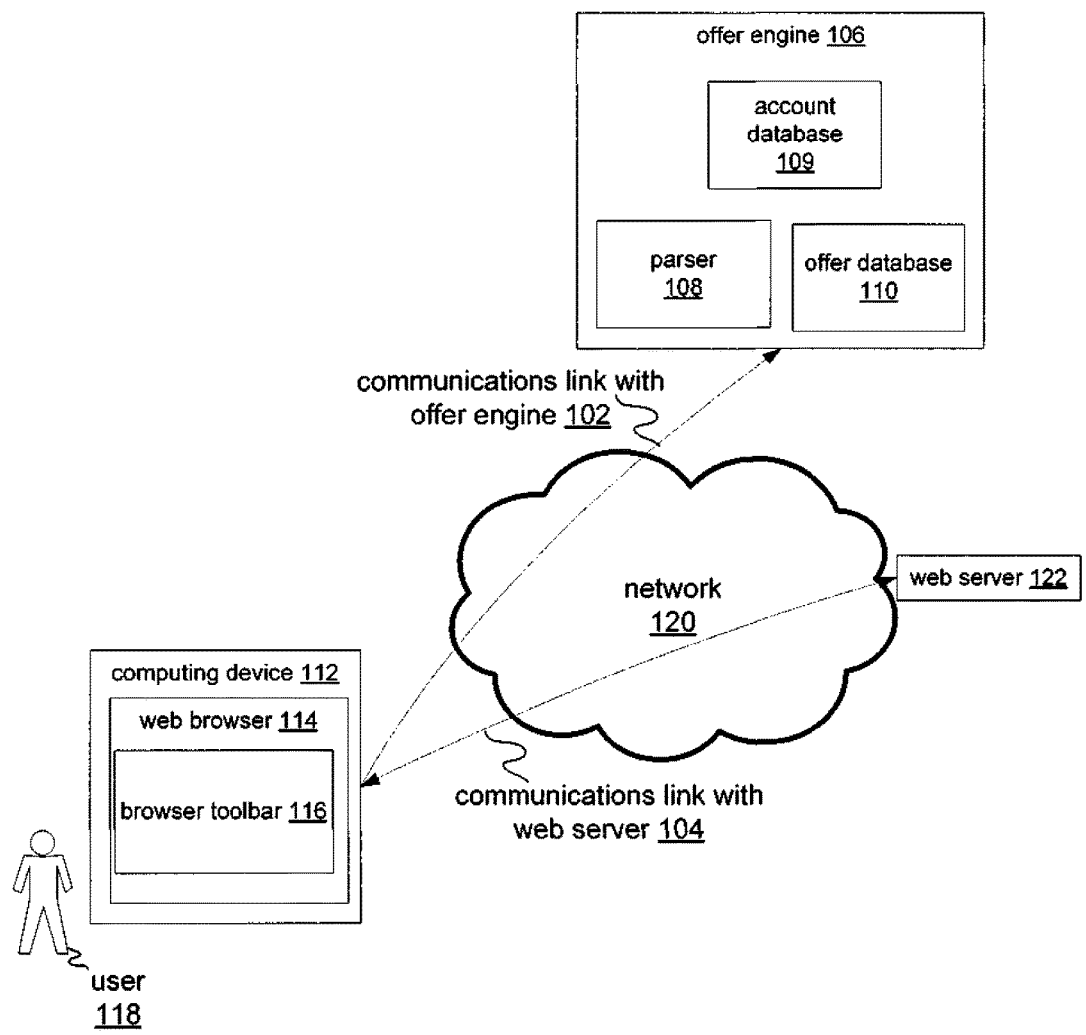
FIG. 1 illustrates an example system for providing targeted, competitive offers to a user who is accessing a communications network.
Figure 2:
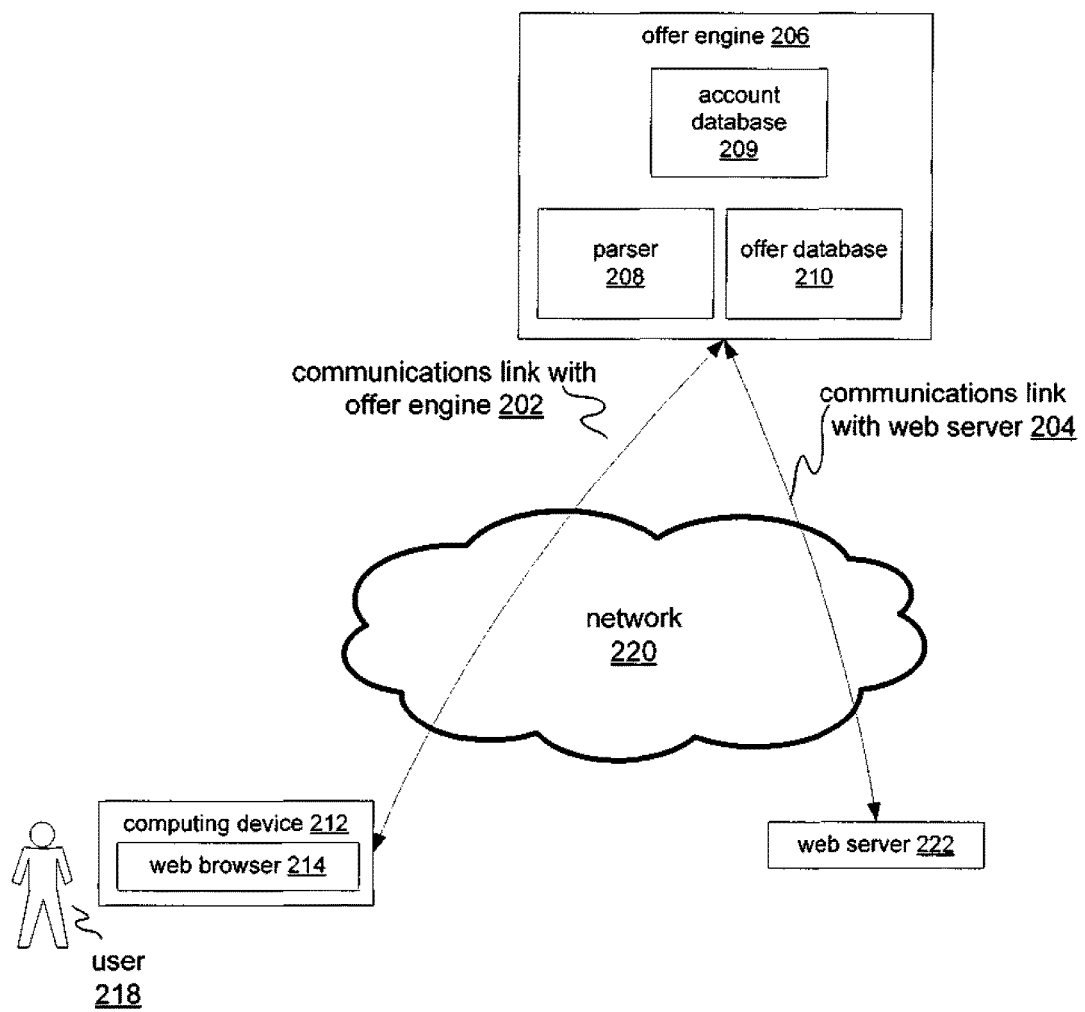
FIG. 2 illustrates another example system for providing targeted, competitive offers to a user who is accessing a communications network.
Figure 3:
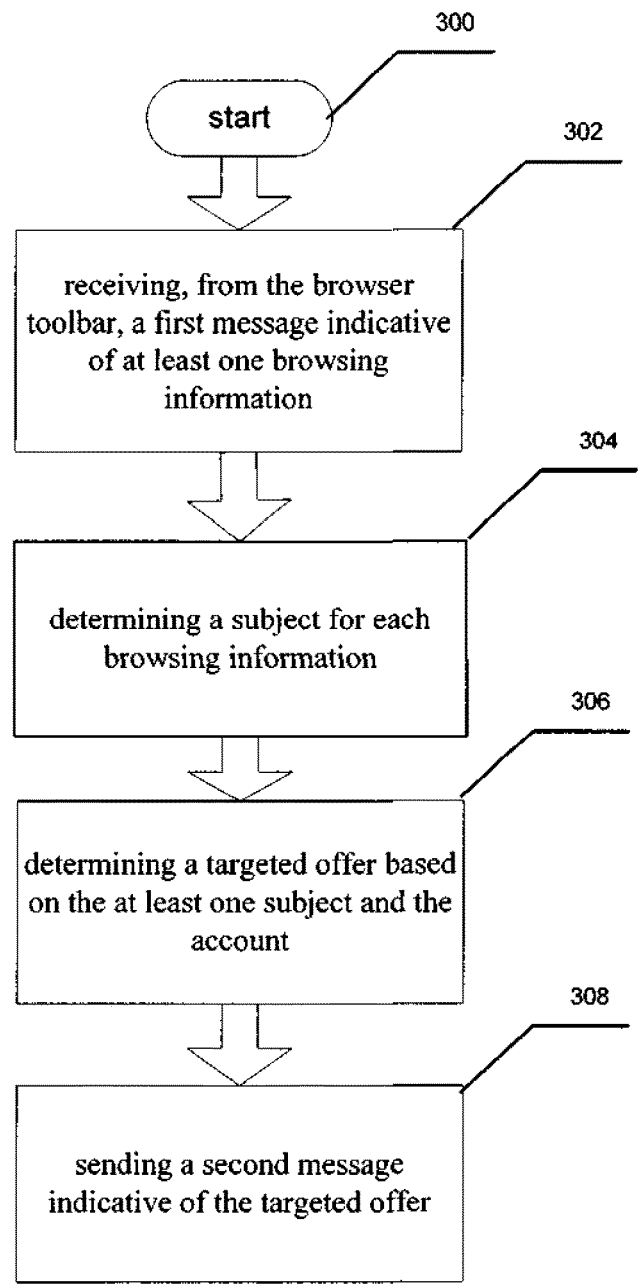
FIG. 3 illustrates an example operational procedure for providing targeted, competitive offers to a user who is accessing a communications network.

Certain specific details are set forth in the following description and figures to provide a thorough understanding of various embodiments. Those of ordinary skill in the relevant art will understand that they can practice other embodiments without one or more of the details described below. While various methods are described with reference to steps and sequences in the following disclosure, the description as such is for providing a clear implementation of embodiments of the invention, and the steps and sequences of steps should not be taken as required. FIGS. 1 and 2 illustrate operating environments in which operating procedures may be performed. FIG. 3 depicts example operating procedures.

In addition, while various methods are described with reference to steps and sequences in the following description, the description is intended to describe a clear implementation of embodiments of the invention, and the steps and sequences of steps should not be taken as required to practice this invention. In general, it is contemplated that the various systems, methods, and computer readable media disclosed herein will be implemented within a computing system. Such a system will generally include "subsystems" for automatically handling the operations described below in the manner described below. It should be understood that the various subsystems may be implemented with computer software that is executable by a processor, as described.

FIG. 1 illustrates a system for providing targeted, competitive offers to a user who is accessing a communications network. Those skilled in the art will note that the elements are illustrative in purpose and that different implementations can select appropriate elements for such implementations.

An offer may comprise a commercial advertisement. It may also comprise a suggestion to perform a noncommercial course of action, such as presenting exercise advice, or suggesting a group or association to join. An offer may further comprise a recommendation, such as recommending that a user view a certain movie based on his or her interest in another movie. As used herein, the term "offer" is intended to be broadly construed so as to encompass, among other things, advertisements and presentments that do not necessarily constitute commercial "offers" under the Uniform Commercial Code or other legal regimes.

In an embodiment, a user 118 uses a web browser 114 on a computing device 112 to connect to a remote web server 122 via a communications link with the web server 104 across a communications network 120.

The web browser 114 may comprise a program executing on a computing device 112 that is configured to send requests for web pages and display the received web pages. In another embodiment, it may comprise dedicated hardware configured to do the same.

The computing device 112 may comprise a personal computer, a cellular telephone configured to send and receive computer data, a personal data assistant configured to do the same, or the like.

The remote web server 122 may comprise a computing device that stores at least one web page and is configured to send each web page that it stores to a computing device that requests it across the network 120.

The communications link between the user's computing device 112 and the web server 122 across the network 120 may comprise a series of data packets sent between the web server 122 and the user's computing device 112 in accordance with a communications protocol, such as the hypertext transfer protocol, the transmission control protocol/internet protocol or the user datagram protocol.

In one embodiment, the user's web browser is further configured to include a browser toolbar 116. Third-party toolbars for browsers are best known for adding functionality and ease-of-use options to the end user. While the browser itself handles basic browsing navigation (Back, Stop, Reload, etc) using its own toolbars, external toolbars often add additional functionality to browsers (additional search fields, form-fill, links back to popular sites, etc.). In the present example, browser toolbar 116 may be computer software that interfaces with the web browser and collects information on the web page viewing of the user 118 via the web browser 114. In another embodiment, the user's web browser is further configured to include a browser plug-in that provides similar functionality as the toolbar 116.

The browser toolbar 116 is connected to (or configured to communicate with) an offer engine subsystem 106 across the network 120 via the communications link with the offer engine 102. This communications link with the offer engine 102 may comprise a series of data packets sent between the web server 122 and the user's computing device 112 in accordance with a communications protocol, such as the hypertext transfer protocol, the transmission control protocol/internet protocol or the user datagram protocol.

In an embodiment, a local offer engine is stored and executes on the user's computing device. In such a case, the offer engine may download a database of offers that are matched to subjects. The offer engine could generate offers by itself, or in tandem with a remote offer engine. Where it generates offers with a remote offer engine, the local offer engine that is stored on the user's computing device may generate and return offers when the offer engine 106 is either offline, unavailable, or communicating with the user's computing device on a communications link that is not reliable enough to facilitate real-time offers.

The local offer engine may periodically download updates to its database so that it has a contemporary list of offers. In an embodiment, the database would be encrypted so that the database entries could not be viewed by a user outside of the normal offer generation environment. If someone were to be able to decrypt the offer database, it would possibly contain a wealth of competitive information due to the nature of the data needed to make an offer.

In an embodiment, where the local offer engine lacks an offer for a given subject, it may store that subject. Then, when communication with the offer engine 106 resumes, it can communicate that subject to the offer engine 106, which would then generate an offer for the subject. Given that the delay might mean that the offer would no longer be real-time, in an embodiment, the delayed offer could be delivered in a different way than the real-time offer, such as via e-mail, where the offer engine has an e-mail address known for the user.

In one embodiment, the offer engine 106 may comprise at least one subsystem for parsing 108, at least one account database 109 and at least one offer database 110.

In one embodiment, the user uses the web browser 114 to access a web page stored on the web server 122. When the user does this, the browser toolbar 116 sends a message indicative of browsing information concerning this exchange to the offer engine 106. The browsing information may comprise information identifying the user, the uniform resource locator of a web page to be viewed, the time spent on a web page, a search term entered into a search browser, other information inputted into a web page (such as personal information added to the user's profile where the web server 122 stores at least one web page which comprises a social networking website), the number of times the user has viewed the current web page, and if the user came to the web page via a link, which other web page contains that link.

In an embodiment, the offer engine 106 receives this message by at least one subsystem for parsing 108 and then parses this message to determine the browsing information, including a subject of the browsing information. This subject of the browsing information may comprise the item, concept or matter that the user is interested in or trying to find. In an embodiment, the subject may comprise an underwritten account, and a product that may be underwritten. In an embodiment, determining the subject information may comprise maintaining, by the offer engine 106, a database of uniform resource locators (URLs) with a corresponding subject or subjects, or also a corresponding offer or offers. Where the message comprises the URL of the web page that the user is attempting to navigate to, a subsystem for parsing 108 may parse the message to determine that URL, and then the offer engine 106 may look up that URL in this database to find the corresponding subject or subjects. In another embodiment, where the message comprises the text of the web page, a subsystem for parsing 108 may parse the message to extract the text of the web page and then the offer engine may use any of a variety of text processing algorithms to determine the subject. In another embodiment, where the message comprises a text query that the user has entered into a search engine website, such as one offered by Google™ or Yahoo!™, a subsystem for parsing 108 may parse this text query from the message and determine it to be the subject Once the subject is determined, the offer engine 106 may look up an offer suitable for the subject in the offer database 110. For instance, where the subject is automobile purchases, the offer may comprise an offer to open an automobile insurance policy. Where the subject is a film to view, the offer may comprise a different film to view that users who enjoy the first film are likely to also enjoy. In an embodiment, the at least one system for parsing 108 also parses out information which uniquely identifies the user. This is used to look up the user's account or accounts in the account database 109. In an embodiment, an account comprises an underwritten account, such as one for an automobile insurance policy. In at least one embodiment, the offer engine 106 now has the user's account information and an offer, and may use the account information to determine details of the offer. For instance, where the offer comprises an offer to open an automobile insurance policy, and the user's account information shows that the user has a clean driving record and represents a relatively small risk, the details of the offer may reflect a lower premium price than where the user's account information shows that the user has a history of getting into automobile accidents and represents a relatively large risk. In at least one embodiment, where the risk is deemed to be unacceptably large, the offer engine 108 may determine to not make an offer 118 to the user on this subject, or to make a different type of offer to the user 118 (in this automobile example, this different offer could comprise an advertisement for a driving school). In another embodiment, where the targeted offer comprises an offer to open an underwritten account, the targeted offer may have at least one detail, and a detail may comprise a price, a length of time that the underwritten account would last, an expiration date of the targeted offer, and a pre-requisite to engaging the targeted offer (such as the user verifying that he is at least 18 years old).

When the offer and details of the offer have been determined, the offer engine 106 sends a message indicative of the offer to the browser toolbar 116, which displays the offer to the user 118. In an embodiment, this may comprise the browser toolbar 116 directing the web browser 114 to display a pop up window indicative of the offer, to display text, audio, images or video added to the currently viewed web page. In another embodiment, this may comprise the browser toolbar 116 directing the web browser 114 to add links to the text of the currently viewed web page, which when clicked by the user display the offer. In another embodiment, the browser toolbar 116 could directly generate a pop up window indicative of the offer and then display it to the user 118 on the user's computing device 112.

FIG. 2 illustrates another example system for providing targeted, competitive offers to a user who is accessing a communications network. Those skilled in the art will note that the elements are illustrative in purpose and that different implementations can select appropriate elements for such implementations.

In an embodiment, a user 218 uses a web browser 214 on a computing device 212 to connect to a remote web server 222 across a communications network 220. The offer engine 206 may act as a proxy between the computing device 212 and the web server 222. The computing device 212 may communicate with an offer engine subsystem 206 via a communications link with the offer engine 202 across the network 220. The offer engine 206 may communicate with the web server 222 via a communications link with the web server 204 across the network 220.

In an embodiment of the present disclosure, the offer engine 206 acts as a proxy, and both the computing device 212 and the web server 222 operate as if they were communicating directly through the network 220 without any communication occurring through the offer engine 206.

The web browser 214 may comprise a program executing on a computing device 212 that is configured to send requests for web pages and display the received web pages. In another embodiment, it may comprise dedicated hardware configured to do the same.

The computing device 212 may comprise a personal computer, a cellular telephone configured to send and receive computer data, a personal data assistant configured to do the same, or the like.

The remote web server 222 may comprise a computing device that stores at least one web page and is configured to send each web page that it stores to a computing device that requests it across the network 220.

The communications link 202 between the user's computing device 212 and the offer engine 206 across the network 220 may comprise a series of data packets sent between the web server 222 and the user's computing device 212 in accordance with a communications protocol, such as the hypertext transfer protocol, the transmission control protocol/internet protocol or the user datagram protocol.

An offer engine subsystem 206 may be further connected to the web server 222 across the network 220 via the communications link with the web server 204. This communications link with the web server 204 may comprise a series of data packets sent between the web server 222 and the user's computing device 212 in accordance with a communications protocol, such as the hypertext transfer protocol, the transmission control protocol/internet protocol or the user datagram protocol.

In one embodiment, the offer engine 206 may comprise at least one subsystem for parsing 208, at least one account database 209 and at least one offer database 210. The offer engine may comprise a networked proxy device, such as a router or switch, or a computing system. In one embodiment, the offer engine 206 is possessed by an entity functioning as an internet service provider, and at least some of the data traffic across its network by its users is directed through the offer engine 206.

In an embodiment, the user uses the web browser 214 to access a web page stored on the web server 222. When the user does this, the offer engine 206 may capture this browsing information as it receives it and forwards it to the web server 222. The browsing information may comprise information identifying the user, the uniform resource locator of a web page to be viewed, the time spent on a web page, a search term entered into a search browser, other information inputted into a web page (such as personal information added to the user's profile where the web server 222 stores at least one web page which comprises a social networking website), the number of times the user has viewed the current web page, and if the user came to the web page via a link, which other web page contains that link. In an embodiment, the browsing information has a destination web server and receiving a first message includes sending the browsing information to the destination web server.

In an embodiment, the offer engine 206 receives this message by at least one subsystem for parsing 208 and there parses this message to determine the browsing information, including a subject of the browsing information. Once the subject is determined, the offer engine 206 may look up an offer suitable for the subject in the offer database 210. For instance, where the subject is automobile purchases, the offer may comprise an offer to open an automobile insurance policy. Where the subject is a film to view, the offer may comprise a different film to view that users who enjoy the first film are likely to also enjoy. In an embodiment, the at least one system for parsing 208 also parses out information which uniquely identifies the user. This is used to look up the user's account or accounts in the account database 209. In at least one embodiment, the offer engine 206 now has the user's account information and an offer, and may use the account information to determine details of the offer. For instance, where the offer comprises an offer to open an automobile insurance policy, and the user's account information shows that the user has a clean driving record and represents a relatively small risk, the details of the offer may reflect a lower premium price than where the user's account information shows that the user has a history of getting into automobile accidents and represents a relatively large risk. In at least one embodiment, where the risk is deemed to be unacceptably large, the offer engine 208 may determine not to make an offer 218 to the user on this subject, or to make a different type of offer to the user 218 (in this automobile example, this different offer could comprise an advertisement for a driving school).

When the offer and details of the offer have been determined, the offer engine 206 sends a message indicative of the offer to the user's web browser 214, which displays the offer to the user 218. In an embodiment, comprise the offer engine 206 taking web pages returned by the web server 222 and modifying them to instruct the web browser 214 to display a pop up window indicative of the offer, to display text, audio, images or video added to the currently viewed web page. In another embodiment, this may comprise the offer engine taking at least one web page returned by the web server 222 and modifying them to add links to the text of the currently viewed web page, which when clicked by the user display the offer. In another embodiment, the offer engine 206 may generate a web page or pop up window indicative of the offer and send it across the communications link 202 to the user's web browser 214 for display to the user 218. In an embodiment, the offer engine 206 receives from the web server a web page that corresponds to the web page requested from the browsing information, modifies that received web page to include the targeted offer, and sends to the user the targeted offer consisting of the modified web page. In an embodiment, modifying the received web page to include the targeted offer includes adding a hypertext link to each occurrence of the text of the subject in the received web page, such that clicking on such a link shows the targeted offer.

FIG. 3 illustrates a computer-based method for providing targeted, competitive offers to a user who is accessing a communications network. Those skilled in the art will note that the elements are illustrative in purpose and that different implementations can select appropriate elements for such implementations.

Operation 300 begins the operational process. Operation 300 can be triggered for example in response to the user turning on his or her computing device 112, 212 or connecting that device to a communications network 120, 220.

Operation 302 depicts receiving, from the browser toolbar, a first message indicative of browsing information. In an embodiment, this may comprise receiving, by the offer engine 106, the first message from a browser toolbar 116 that is integrated with a web browser 114 and executing on the computing device 112 of a user 118. In another embodiment, this may comprise receiving, by the offer engine 206, a request by the user 218 to view a web page intended for the web server 222. The offer engine 206 may store this information in addition to forwarding it to the web server 222.

In an embodiment, the subject comprises information indicative of a potential purchase that the user is considering. For example, where the user is viewing a web page dedicated to a specific automobile that is for sale, the browsing information may comprise information that indicates that the user is considering purchasing such an automobile.

Operation 304 depicts determining at least one subject for the browsing information. In an embodiment, this may comprise a subsystem for parsing 108, 208 that is part of the offer engine 106, 206 parsing the browsing information to determine the subject. For instance, where each browsing information is sent as an extensible markup language file, the parser may take the schema dictated by the file and isolate the portion that the schema indicates comprises the subject.

In an embodiment, the subject may comprise a product for the user to purchase. In the above example where the user is viewing a web page dedicated to a specific automobile that is for sale, the subject may comprise that automobile.

Operation 306 depicts determining a targeted offer based on at least one subject and the account. In one embodiment, the offer engine 106, 206 receives information that uniquely identifies the user 118, 218 from a parsing subsystem 108, 208, which parsed it from a browsing information and looks up the user's account in an account database subsystem 109, 209. The offer engine 106, 206 also receives the subject from a parsing subsystem 108, 208 and uses it to determine a corresponding offer in the offer database 110, 210. For example, the offer database 110, 210 may comprise a pairing of subjects and offers, and when the offer engine 106, 206 presents the subject to the offer database 110, 210, the offer database 110, 210 returns the subject with its corresponding offer or offers and the offer engine 106, 206 then takes the offer from that returned information.

In an embodiment, the offer engine may determine the details of the offer based on the account. For example, where the offer comprises an offer to open an underwritten account, such as health insurance or automobile insurance, or an offer to open a credit card, information about a particular user determines the terms of the offer. In the case where the offer is an offer to open a credit card, details such as the credit limit and the interest rate are determined by the user's credit risk. Where the account comprises a financial account, the offer engine may analyze the information of that account, such as payment history, average balance and how long the account has existed to determine the credit limit and the interest rate of the offer. In an embodiment, the information of the account may comprise a first name, a last name, a date of birth, a duration that the account has existed, a transaction history of the account, and a current status of the account.

In an embodiment, the offer may comprise a product to purchase, and an insurance policy. In an embodiment, determining the targeted offer may comprise searching a database of targeted offers and associated subjects and identifying a targeted offer in the database having an associated subject that matches the subject of the browsing information In an embodiment, Operation 306 further comprises receiving, from the browser toolbar, a second message indicative of browsing history, and determining the targeted offer based on the browsing history of the second message. In one embodiment, where the browsing history of the second message comprises the user having viewed websites devoted to illegal automobile street racing and the browsing information of the first message comprises the user viewing a website that sells automobiles, the offer engine 106 may determine that the risk is too great to provide the user 118 with automobile insurance, and may not send such an offer to sell automobile insurance to the user 118. In an embodiment, the user's browsing history may comprise a HTTP cookie.

Operation 308 depicts sending a second message indicative of the targeted offer. In an embodiment, the offer engine 106 sends a message indicative of the offer to the browser toolbar 116, which displays the offer to the user 118. In an embodiment, this may comprise the browser toolbar 116 directing the web browser 114 to display a pop up window indicative of the offer, to display text, audio, images or video added to the currently viewed web page. In another embodiment, this may comprise the browser toolbar 116 directing the web browser 114 to add links to the text of the currently viewed web page, which when clicked by the user display the offer. In another embodiment, the browser toolbar 116 could directly generate a pop up window indicative of the offer and then display it to the user 118 on the user's computing device 112.

In another embodiment, the offer engine 206 sends a message indicative of the offer to the user's web browser 214, which displays the offer to the user 218. In an embodiment, comprise the offer engine 206 taking web pages returned by the web server 222 and modifying them to instruct the web browser 214 to display a pop up window indicative of the offer, to display text, audio, images or video added to the currently viewed web page. In another embodiment, this may comprise the offer engine taking at least one web page returned by the web server 222 and modifying them to add links to the text of the currently viewed web page, which when clicked by the user display the offer. In another embodiment, the offer engine 206 may generate a web page or pop up window indicative of the offer and send it across the communications link 202 to the user's web browser 214 for display to the user 218.

CONCLUSION

While the present disclosure has been described in connection with the presently preferred or illustrative aspects, as illustrated in the various figures, it is understood that other similar aspects may be used or modifications and additions may be made to the described aspects for performing the same function of the present disclosure without deviating therefrom. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method for sending offers to a user who is viewing a web page through a web browser on a computing device of the user, wherein the computing device of the user is connected to an offer engine proxy maintained by a third party, wherein the offer engine proxy is interposed between the computing device of the user and a destination web server and wherein the offer engine proxy has a communication link with the computing device of the user and a communication link with the web server across a computer network, the method comprising:
 receiving, by the offer engine proxy, a first message comprising browsing information from the computing device of the user;
 sending, by the offer engine proxy, the first message comprising browsing information to the destination web server;
 receiving, by the offer engine proxy, a resulting web page that corresponds to a web page requested by the browsing information from the destination web server;
 determining, by the offer engine proxy, at least one topic of the browsing information;
 accessing, by the offer engine proxy, user information from an account of the user, wherein the account is with the third party maintaining the offer engine proxy and wherein the account is related to a product provided to the user by an entity sending an offer to the user;
 determining, by the offer engine proxy, an offer to be sent to the user that is based on the at least one topic of the browsing information and the user information from the account of the user, wherein the offer to be sent to the user has terms based upon the user information from the account of the user;
 modifying, by the offer engine proxy, the resulting web page to include an offer to be sent to the user; and
 sending, by the offer engine proxy, a second message comprising the modified webpage including the offer to the computing device of the user across the computer network.

2. A method as set forth in claim 1, wherein modifying the resulting web page to include the offer includes adding a hypertext link to each occurrence of text of the topic in the resulting web page, wherein the hypertext link provides a mechanism for viewing the offer.

3. A method as set forth in claim 1,
 wherein modifying the resulting web page to include an offer to be sent to the user includes adding a hypertext link to each occurrence of text of the topic in the resulting web page, wherein the hypertext link provides a mechanism for viewing the offer; and
 wherein the offer has a subject that corresponds to the at least one topic of the browsing information.

4. A method as set forth in claim 1, wherein the offer comprises an offer to open a credit card, and wherein said user information further includes information as to the user's credit history.

5. A method as set forth in claim 1, wherein the account of the user is for an insurance product and the offer is an offer for insurance services.

* * * * *